United States Patent [19]

Seki

[11] Patent Number: 4,674,880

[45] Date of Patent: Jun. 23, 1987

[54] SPECTROPHOTOMETER

[75] Inventor: Kiwao Seki, Katsuta, Japan

[73] Assignee: Hitachi, Ltd., Tokyo, Japan

[21] Appl. No.: 748,943

[22] Filed: Jun. 26, 1985

[30] Foreign Application Priority Data

Jun. 27, 1984 [JP] Japan ................................ 59-131070

[51] Int. Cl.[4] ............................................. G01J 3/36
[52] U.S. Cl. .................................... 356/328; 364/498
[58] Field of Search ............... 356/300, 308, 319, 326, 356/328, 331; 364/498

[56] References Cited

U.S. PATENT DOCUMENTS

| 4,253,765 | 3/1981 | Kato et al. | 356/308 |
| 4,330,209 | 5/1982 | Hashimoto et al. | 356/308 |
| 4,348,110 | 9/1982 | Ito | 356/328 |

FOREIGN PATENT DOCUMENTS

| 0128822 | 8/1982 | Japan | 356/328 |
| 0128823 | 8/1982 | Japan | 356/328 |

OTHER PUBLICATIONS

Durham III et al., *IBM Technical Disclosure Bulletin,* vol. 19, No. 6, Nov. 1976, p. 2182.

*Primary Examiner*—F. L. Evans
*Attorney, Agent, or Firm*—Antonelli, Terry & Wands

[57] ABSTRACT

The present invention divides the light to be measured, which is incident to a photo-detector having a plurality of photo-cells from a light source through a specimen to be measured and through a dispersion element, into a wavelength of a high sensitivity region and a wavelength of a low sensitivity region, reads out the light of the high sensitivity wavelength region with a quicker period than the light of the low sensitivity wavelength region, and adds the signals thus read out for each wavelength region in order to obtain spectra for the full wavelength.

4 Claims, 5 Drawing Figures

SPECTROPHOTOMETER

FIELD OF THE INVENTION

This invention relates generally to a spectrophotometer, and more particularly to an instrument for measuring spectral intensity in a predetermined wavelength region in a way that is little affected by noise.

BACKGROUND OF THE INVENTION

Spectrophotometers generally use a photo-sensor in their optical quantity measuring circuit. The photo-sensor contains in its signal a dark current component and switching noise at the time of change-over of a read-out switch for reading out the output from the sensor, that is, at the time of change-over of the photo-sensor, as noise components.

The noise $e_n$ can be expressed by the following formula:

$$e_n = k_n \cdot I + e_n \tag{1}$$

where
I: signal quantity,
$k_n I$: noise component depending upon signal quantity such as change of optical source,
e: noise component not depending upon signal quantity such as switching noise.

Switching noise does not depend upon storage time (exposure time). Therefore, if the storage time is prolonged, the influence of switching noise can be reduced, and S/N (signal-to-noise ratio) can be improved. However, since a photo-sensor can not store a charge above a predetermined level, a suitable storage time exists for an incident optical quantity.

The output of a photosensor falls off on both the long wavelength side and on a short wavelength side. This results from the fact that the sensitivity characteristics of a photo-sensor as well as the incident optical quantity drop on the long wavelength side and on the short wavelength side. In other words, both the sensitivity of the photo-sensor and the incident optical quantity are wavelength dependent.

The S/N ratio deteriorates at these lower output portions from the above-mentioned relation with the noise (because of independence of the signal quantity). As a prior art reference which improves the S/N ratio in a low sensitivity wavelength region, mention can be made of Japanese Patent Laid-Open No. 128823/1982 entitled "Spectrophotometric Instrument" which was laid open on Aug. 10, 1982.

In accordance with this prior art reference, scanning is repeated more times in the low sensitivity wavelength region than in the high sensitivity wavelength region, the spectral output of each wavelength region is added and the spectral output of the full wavelength regions is produced.

However, this prior art instrument involves the following problems:

(1) The measurement time for signals in the low sensitivity regions differs from that of the high sensitivity region; hence, synchronism is lost with the consequent loss of the characteristics determining two spectra.

(2) While measurement is being repeated many times in the low sensitivity ranges, the signals of the high sensitivity regions are discarded, so that the S/N ratio in the high sensitivity region can not be improved.

Turning back again to the formula (1) described already, noise such as the switching noise has a substantially constant value and can be neglected in a region where a signal strength is great. Such noise, however, becomes a critical factor in the low sensitivity regions. Noise components exist also which are proportional to the signal quantity, such as the change of a light source, the temperature change, and the like. For these reasons, the S/N ratio must be improved in the high sensitivity range, too.

SUMMARY OF THE INVENTION

The present invention is directed to provide a spectrophotometer which can measure signals with a high S/N ratio without losing the synchronism of data.

The characterizing feature of the present invention lies in that the read periods of a plurality of a photosensors of a spectrophotometer are varied in accordance with wavelength regions. In other words, read-out is faster with those photo-sensors which measure an intermediate wavelength region in which the photo-sensor sensitivity is high, than with those which measure the other wavelength regions; and a measured signal for each wavelength is added and stored by external circuits. As a result, since the signals are being measured continuously by the photo-sensors for the whole wavelength, the synchronism of the spectra is not lost and noise can be reduced.

DESCRIPTION OF THE PREFERRED EMBODIMENTS

Figure 1:
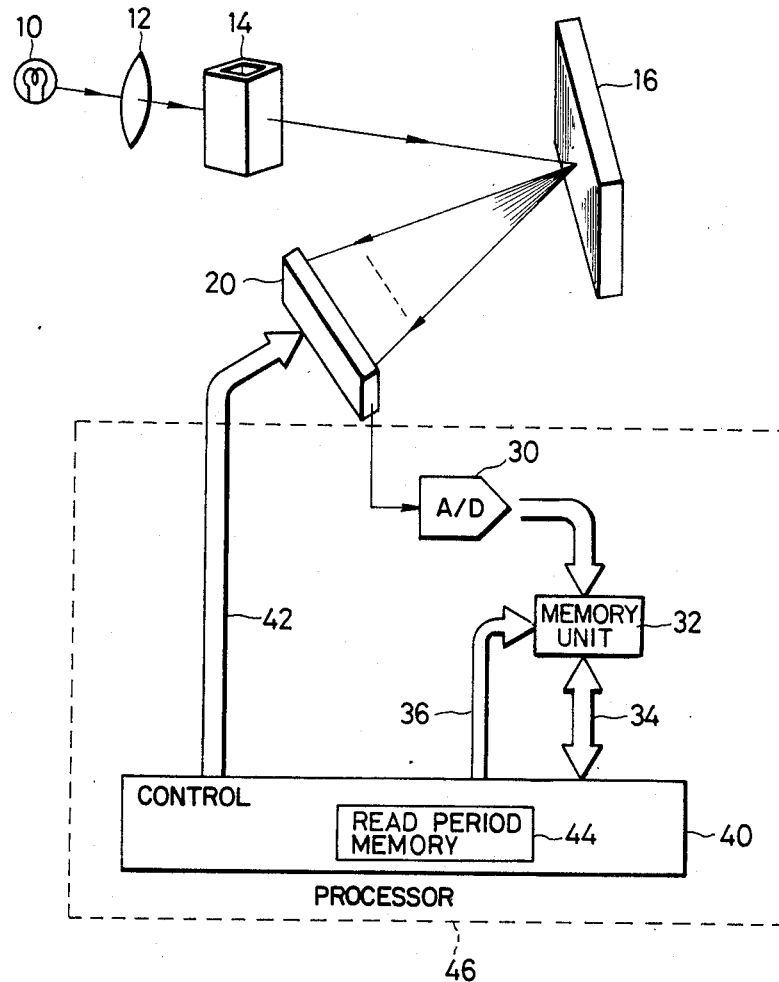
FIG. 1 is a schematic view showing a spectrophotometer in accordance with one embodiment of the present invention.

Referring initially to FIG. 1, the light from a light source 10 is shown converged by a convergent lens 12 and is radiated to a specimen 14 to be measured. The light passing through the specimen 14 is separated into wavelengths by a diffraction grating 16. The resulting spectra are radiated to a photo-detector 20 which includes a plurality of photo-cells 22A–22N that are disposed so as to correspond to the wavelengths and effect photoelectric conversion for each wavelength. A read-out cell address 42 is supplied to the photo-detector 20 from a control portion 40 of a data processor 46 and the output of each photo-cell 22A–22N is read out. The read-out cell address is set in a different period so as to correspond to each wavelength. The cell address 42 is stored in advance in a read period memory 44. The signals read out from the photo-cells 22A–22N are converted to digital signals by an A/D converter 30, and are stored and added in a memory unit 32 for each wavelength. That is, new signal data from the A/D converter 30 for such wavelength is added to a previously stored signal data and then stored in the memory unit 32. After the measurement is complete, measured data 34 are taken out and are displayed on a recorder or the like.

Figure 2:
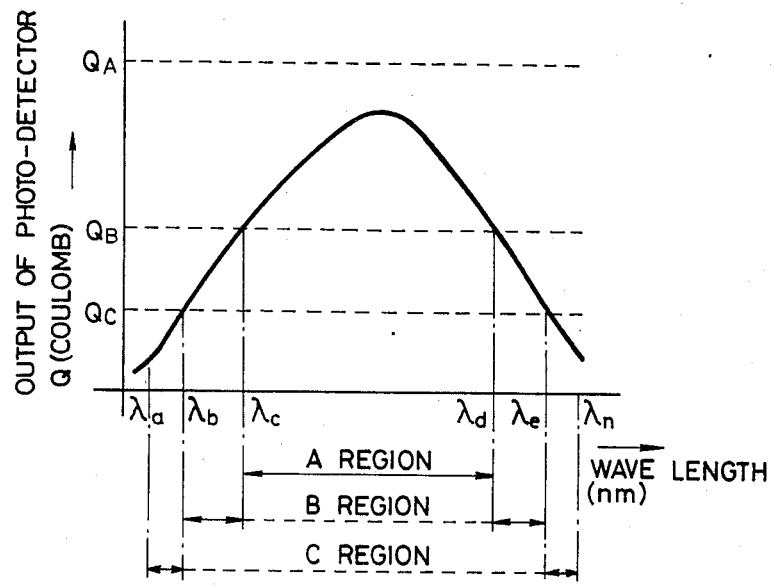
FIG. 2 is a diagram showing the relation between the wavelength of incident light and a read period.

FIG. 2 is a diagram showing the relation between the wavelengths $\lambda_a$–$\lambda_n$ of the incident light received by a plurality of photo-cells constituting the photo-detector and the output Q obtained from these photo-cells, and this relation and division of the read period. The read period is divided into a plurality of periods by the output Q of the photo-cells. In other words, it is divided into an A region in which the photo-cell output exceeding $Q_B$ is obtained, a C region in which the output is below $Q_C$ and a B region where an intermediate output is obtained. The read periods are set appropriately in accordance with these A, B and C wavelength regions and are stored in advance in the read period memory 42 described already.

In the present invention, the storage time in which the photo-cells in the C region can obtain sufficient outputs but do not go into saturation of $Q_{max}$ is called T. In the B region, the read-out operation is effected twice, that is, the storage time is T/2 and the storage change is $Q_{max}/2$. In the A region, the read-out operation is effected four times, that is, the storage time is T/4 and the storage charge is $Q_{max}/4$. Here, the storage time T can be given by the following formula:

$$T = Q_{max}/I_{max}$$

where $Q_{max}$: maximum stored charge, $I_{max}$: maximum value of optical current in C region.

Figure 3:
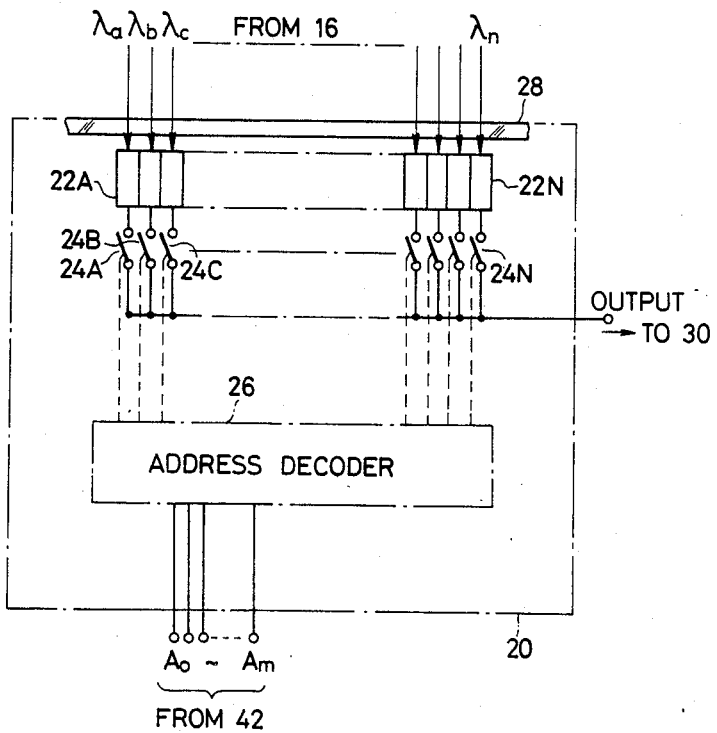
FIG. 3 is a circuit diagram of a photo-detector of the present invention.

In FIG. 3, the photo-detector 20 is shown composed of a photo diode, a plurality of photo-cells 22A–22N consisting of junction capacity connected in parallel with the photo diode, switches 24A–24N disposed so as to correspond to the photo-cells, respectively, and an address decoder 26 for making conductive a selected switch of the switches 24A–24N and effecting the read-out operation. The read-out cell address 42 from the control portion 40 passes through the address decoder 26 and makes sequentially conductive the switch 24 that corresponds to the photo-cell of the region for which the read-out operation is to be effected. Then, the stored charge of the photo-cell is sequentially produced.

Figure 4:
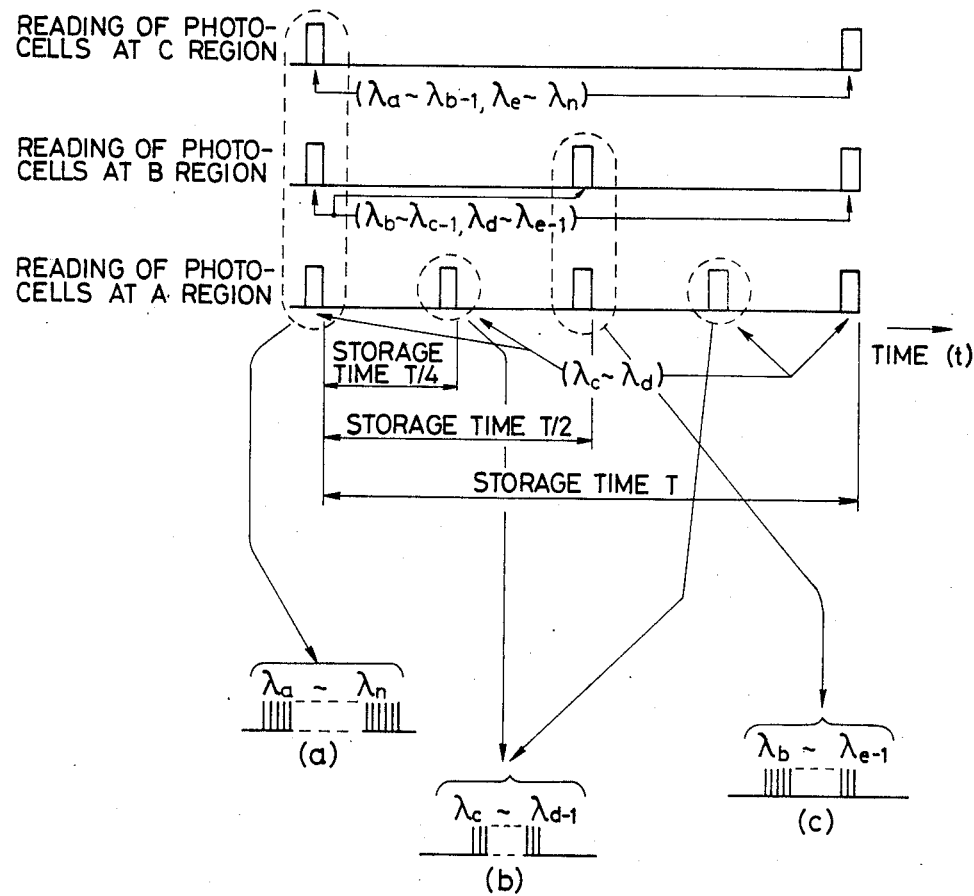
FIG. 4 is a schematic view showing the read period timing.

The read-out cell address 42 shown in FIG. 3 is applied to the photo-detector 20 in accordance with the read period set for each of the A, B and C regions as shown in FIG. 4, and each of the A, B and C regions shown in FIG. 2 reads out the output of the photo-cell corresponding thereto in accordance with the timing shown in FIG. 4. Symbols $\lambda_a$–$\lambda_n$ shown in FIG. 4 correspond to $\lambda_a$–$\lambda_n$ plotted on the abscissa of FIG. 2.

Figure 5:
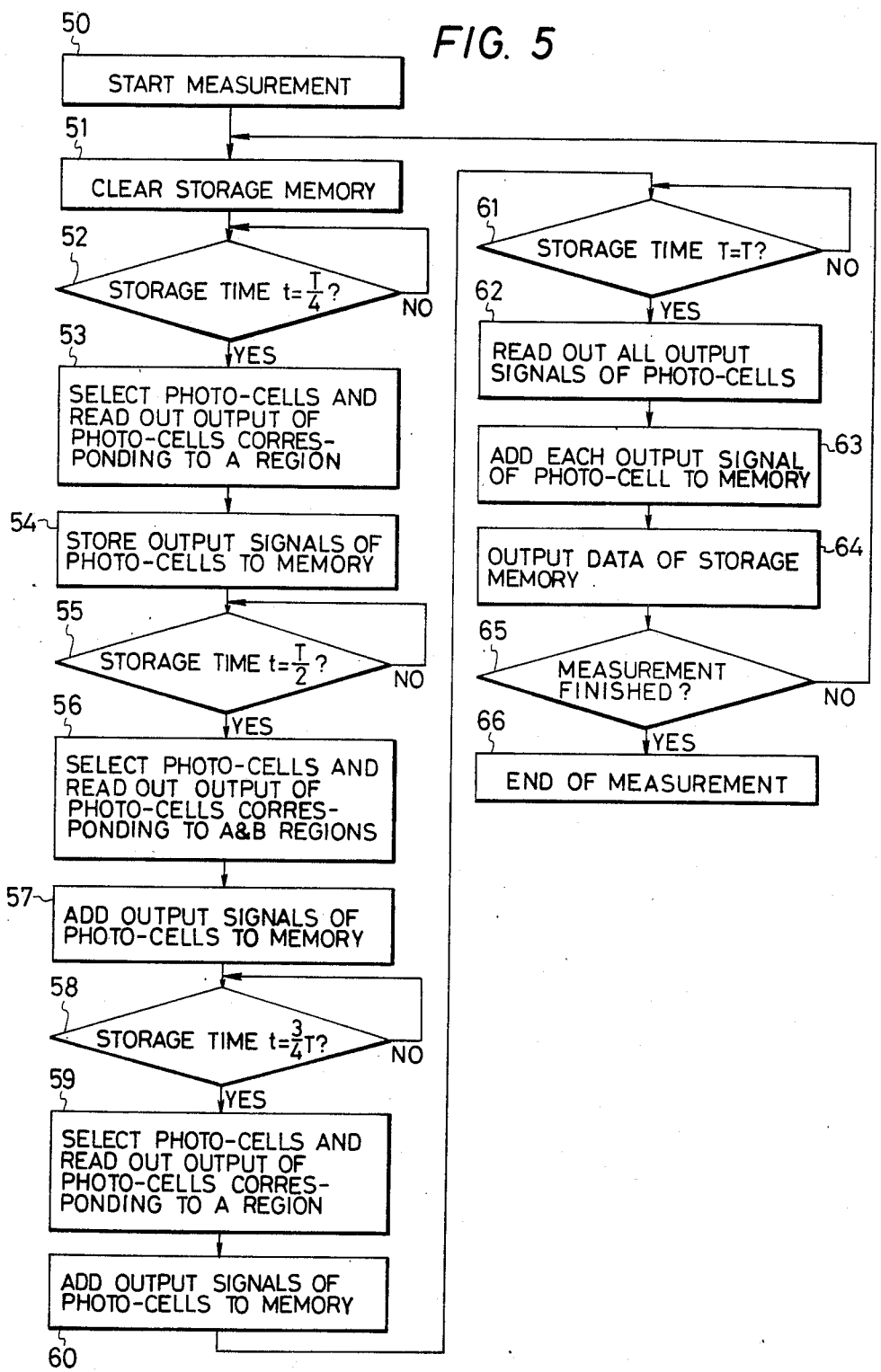
FIG. 5 is a flowchart showing the operation sequence of the spectrophotometer of the present invention.

In FIG. 5, the measurement is started at step 50 for three different periods. The content of a temporary storage memory of memory unit 322 is cleared at step 51. At step 52, the storage time is checked to see if t=T/4. At step 53, the switches corresponding to the photo-cells of the A region are sequentially rendered conductive by the read-out cell address 42 from the control portion 42, and the stored charges of these cells are sequentially read out. The charge thus read out is stored in the respective temporary storage memory at step 54. At step 55, the storage time is checked to see if t=T/2. At step 56, the switches corresponding to the photo-cells of the A and B regions are sequentially rendered conductive by the read-out cell addresses 42 from the control portion 40, and their stored charges are sequentially read out. The charge thus read out is stored in, or added by and stored in, the respective temporary storage memory of memory unit 32 at step 57. At step 58, the storage time is checked to see if t=3T/4. At step 59, the switches corresponding to the photo-cells of the A region are rendered sequentially conductive by the read-out cell addresses 42 from the control portion 40, and their stored charges are sequentially read out. The charge thus read out is added and stored in the respective temporary storage memory of memory unit 32 at step 60.

At step 61, the storage time is checked to see if t=T. At step 62, the switches corresponding to the photocells of all the regions are sequentially rendered conductive by the read-out period addresses 42 from the control portion 40, and their stored charges are stored in, or added by and stored in, the respective temporary storage memory of the memory unit 32. The measured data 34 are taken out from the temporary storage memories of the memory unit 32 and are displayed on a recorder or the like at step 64. If the measurement is not completed at step 65 but is to be continuously made, the content of the temporary storage memory of the memory unit 32 is cleared at step 51, and the measurement is then repeated in the same way as described above.

In the embodiment described above, the region is divided into the three regions and the storage time is divided into $\frac{1}{2}$ and $\frac{1}{4}$ for T. When the long wavelength region is wide, for example, it is preferred that the storage time is $\frac{1}{3}$, 1/5, 1/6 and the like.

Since the read-out operation is effected with different storage time in accordance with the difference of the sensitivity of a plurality of photo-cells or with the difference of incident optical quantities, the read-out operation can be made at a substantially constant stored charge for each photo-cell.

If the number of times of switching is N, the switching noise expressed by the formula (1) is generally proportional to N and the signal noise is proportional to 1/N. In the present invention, the interval between the read-out times of the output of the photo-cells is reduced (or the number of times of the read-out operations is increased) in the high sensitivity region where the signal quantity is great and the capacitor of each photo-cell is likely to reach saturation, in order to prevent the saturation, and the S/N ratio based upon the signal noise can be improved by increasing the number of times of the read-out operations. In the present invention, further, the interval between the read-out times of the output of the photo-cells is prolonged or increased in the low sensitivity region where the signal quantity is small and the switching noise at the time of the read-out is influential, and the S/N ratio based upon the switching noise can be improved.

In addition, since all the photo-cells of the photodetector continue to receive the light in the present invention, the synchronism of the measured data is not lost.

What is claimed is:

1. A spectrophotometer comprising dispersion means for dispersing light to be measured and photo-detector means having a plurality of photo-cells for receiving the light dispersed by the dispersion means and providing outputs indicative thereof, means for dividing the photo-cells into groups so as to provide different sensitivity regions for the light received by the photo-cells, means for reading out during one measurement cycle outputs from the groups of photo-cells of the different sensitivity regions a differing number of times, and means for adding and storing the outputs read out from respective ones of the photo-cells of the groups a different number of times during the one measurement cycle so as to provide an output indicative of the light received by the plurality of photo-cells over the different sensitivity regons during the one mesurement cycle with an improved signal to noise ratio.

2. A spectrophotometer according to claim 1, wherein the photo-detector means includes a plurality of switches corresponding to the plurality of photo-cells, the means for reading out includes address decoder means for energizing the switches of different groups of photo-cells for enabling read out of the outputs from the associated photo-cells, read period control means for controlling the period of reading out the outputs of the different groups of photo-cells and for providing an output to the address decoder means for enabling reading out of the outputs from selected different groups of photo-cells, A/D converter means for converting the outputs read out from the photo-cells to a digital quantity, and the means for adding and storing includes data memory means for adding and storing the output of the A/D converter means in such a manner that during one measurement cycle previously stored data for a photo-cell of a group during the one measurement cycle is added to new data for the photo-cell of the group and the added data is stored in the data memory means during the one measurement cycle, the read period control means controlling the address decoder means so that the read out time interval of the output of the photo-cells is reduced and the read out time thereof is increased for a group of photo-cells of a high sensitivity light reception region and the read-out time interval time of photo-cells is increased and the read-out time thereof is decreased for a different group of photo-cells of a low sensitivity light reception region.

3. A spectrophotometer according to claim 2, wherein the read period control means includes a read period memory, the read period memory storing data for an interval of time corresponding to the different light sensitivity regions and controlling the read out time interval of the outputs of the photo-cells of different groups in accordance with the stored time interval data.

4. A spectrophotometer according to claim 2, wherein the read period control means generates an instruction signal for enabling the data memory means to add and store the output of the A/D converter means for each period T of one measurement cycle corresponding to each of wavelength regions within a range where the light reception quantity is from $Q_{max}/2$ to $Q_{max}$, where $T = Q_{max}/I_{max}$, and $Q_{max}$ is a maximum stored charge quantity and $I_{max}$ is a maximum optical current, the read period control means enabling the data memory means to add and store the output of the A/D converter means for each period $T/2$ corresponding to each wavelength region within a range where the reception light quantity is from $Q_{max}/4$ to $Q_{max}/2$, and the read period control means enabling the data memory means to add and store the output of the A/D converter means for each period $T/4$ corresponding to each wavelength region within a range where the reception light quantity is below $Q_{max}/4$.

* * * * *